Dec. 22, 1953

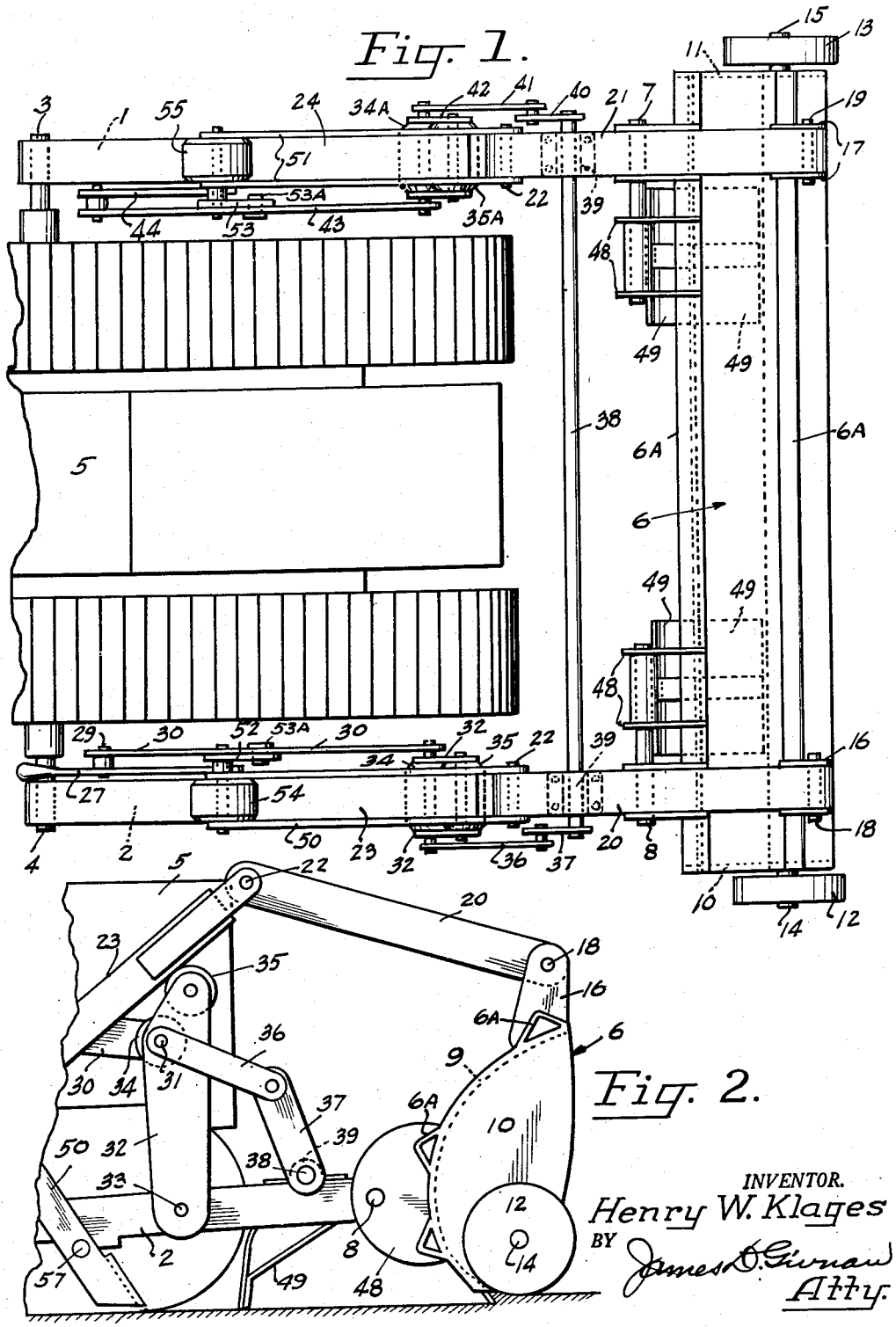

H. W. KLAGES 2,663,099

LAND LEVELING MACHINE

Filed Nov. 24, 1951

INVENTOR.
Henry W. Klages
BY James D. Ginnan
Atty.

Patented Dec. 22, 1953

2,663,099

UNITED STATES PATENT OFFICE 2,663,099

LAND LEVELING MACHINE

Henry W. Klages, Portland, Oreg.

Application November 24, 1951, Serial No. 258,040

3 Claims. (Cl. 37—144)

This invention relates to improvements in land-leveling or excavating machines of the type shown and described in my United States Patent No. 2,284,215, dated May 26, 1942.

It is one of the principal objects of the present invention to provide a scraper blade or moldboard which is readily adapted for attachment to various sizes and types of tractors or other prime movers, and which may be operated with a minimum amount of effort through a series of levers and associated parts from a digging or scraping position to a spreading position and finally into a position elevated with respect to the ground for freedom of travel of the tractor.

Another object is the provision and arrangement of said levers and associated parts so as to render the operation or various movements of the moldboard as aforesaid semi-automatic by the movement of the tractor in a forward or rearward direction.

These and other objects will appear as my invention is more fully hereinafter described in the following specification, illustrated in the accompanying drawings and finally pointed out in the appended claims.

In the drawing:

Figure 1 is a top-plan view of land leveling apparatus made in accordance with my invention and applied to the forward end of any type of conventional tractor.

Figure 2 is a fragmentary side elevation of Figure 1 showing the moldboard in a digging position.

Figure 3:
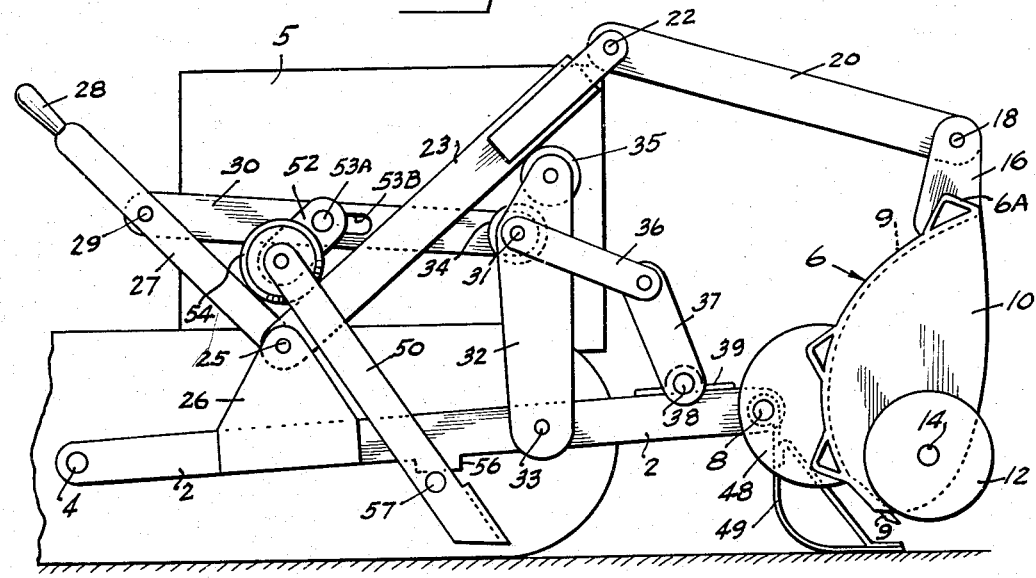
Figure 3 is a view similar to Figure 2 showing the moldboard in an elevated and inoperative position as the tractor is moving rearwardly.

Referring now more particularly to the drawings:

The invention comprises a pair of parallel main beams indicated by reference numerals 1 and 2 and pivotally attached at their inner ends to stub shafts 3 and 4 respectively. The stub shafts are secured to and extend outwardly from the side walls of the tractor body generally indicated at 5. To the forward ends of both main beams, I pivotally attach a moldboard generally indicated at 6 by means of shafts 7 and 8. The moldboard comprises a transverse cutting and scraping blade 9 of arcuate shape in cross section, reinforced by longitudinal ribs 6A and fabricated with or cast integral with side plates 10 and 11. To the lower ends of these side plates I rotatably attach supporting wheels 12 and 13 by means of shafts 14 and 15, respectively, secured to and extending outwardly from said side plates. The top surface of the moldboard is provided with pairs of vertically disposed bearing brackets 16 and 17 to which are pivotally attached by means of pins 18 and 19 the outer ends of two parallel toggle links 20 and 21, whose opposite ends are pivotally connected as at 22 to one end of companion toggle links 23 and 24 respectively. The opposite ends of the toggle links 23 and 24 are pivotally attached as at 25 to the upper ends of vertical brackets 26 whose bottom ends are secured to the main beams 1 and 2 in any approved manner. To one of the brackets 26 is also pivotally attached as at 25 one end of actuating lever whose opposite end terminates in any approved hand grip 28. The lever 27 is pivotally connected intermediate its ends as at 29 to one end of a link 30 whose end is pivotally connected as at 31 to the upper end of a frame 32 whose opposite end is swingably attached as at 33 to the beam 2. The upper end of said frame carries a pair of rollers 34 and 35. Both rollers are adapted for rolling contact with the underside of the toggle links 20 and 23 for raising and lowering the same in accordance with movement of the actuating lever 27 and which movement of the toggle links will of course swing the bottom edge of the moldboard forwardly or rearwardly about its pivotal connections 8 with respect to the main beams 1 and 2. The upper end of the frame 32 is connected by a link 36 to one end of an arm 37 whose opposite end is secured to one end of a shaft 38 which extends across and is rotatably mounted upon the beams 1 and 2 by suitable bearings 39. The opposite end of the shaft 38 is connected to a companion arm 40 connected by a link 41 to a frame 42 which is identical with the frame 32 and which also carries rollers 34A and 35A at its upper end for rolling contact with the underside of toggle links 21 and 24 to function in the same manner as the rollers 34 and 35. The upper end of the frame 42 is connected by means of a link 43, equivalent of the link 30, to one end of an arm 44 which is the equivalent of the lower portion of the handle 27 and whose opposite end is pivotally attached as at 45 to a bracket 46 secured to the beam 1 and which is the equivalent of the bracket 26.

Figure 4:
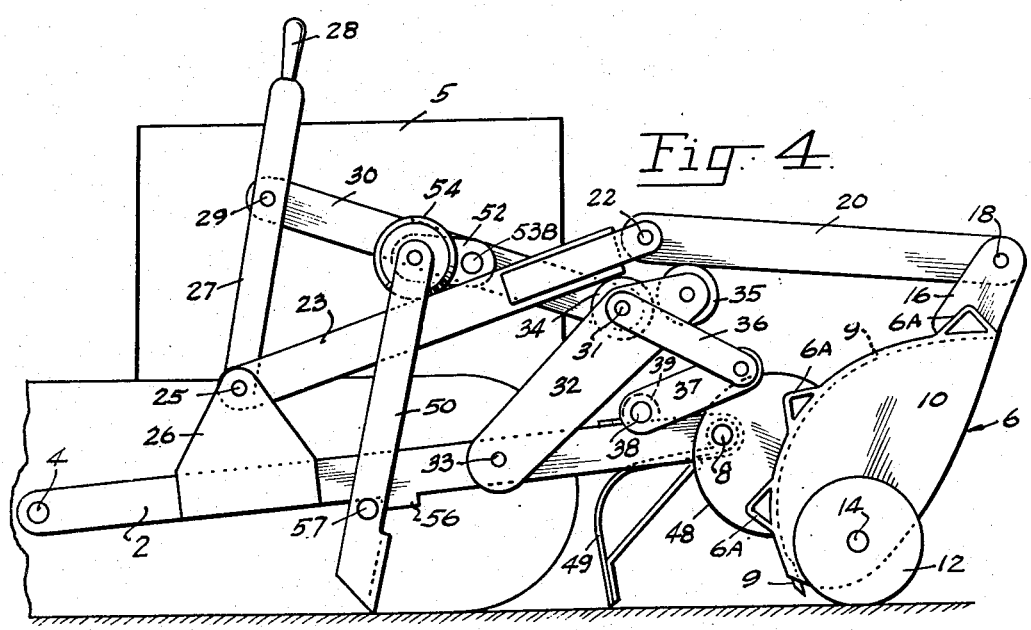
Figure 4 is also a view similar to Figure 2 showing the moldboard in a land-spreading position.

To the rear surface of the moldboard I swingably attach by means of the shafts 7—8 and brackets 48 a pair of skid-shoes 49 shaped as shown, and adapted to automatically assume the position shown in Figure 3 to elevate the moldboard from the ground as the tractor is traveling rearwardly. Upon forward movement of the tractor the leading ends of the skid-shoes will engage with the ground and as the tractor continues to move forward will assume an inoperative position shown in Figure 4 to allow the moldboard to be lowered into the spreading position shown, and wherein the distance between the bottom scraping edge of the moldboard and the ground is determined by the position of the lever 27 which through the medium of the frame 32—42, rollers 34—35 and toggle links 20—23 and 21—24 will rock the moldboard about its pivotal connection to the beams 1 and 2.

Each main beam 1 and 2 intermediate the frames 32—42 and brackets 26 is slidably embraced by the lower ends of lifting legs 50 and 51 whose upper ends are slidably attached by links 52 and 53 and pins 53A to the links 30 and 43, respectively by means of elongated openings 53B formed in the links 38 and 43. The upper ends of the legs are provided with rollers 54 and 55 which are in rolling contact with the top surface of the toggle links 23 and 24 respectively. The bottom end of each leg is pointed forwardly for the purpose of engaging the ground upon forward movement of the tractor to thereby apply downward pressure to the links 20—23 and 21—24 to automatically arrange the scraping edge of the moldboard 10 in a scraping position (see Figure 4) depending upon the position of the actuating lever 27 and companion 44 which through their lever advantage can be held in any desired position by an operator with a minimum of effort to overcome the action of the legs or in other words hold the toggle links in any desired position to resist the action of the legs.

To the underside of each beam 1 and 2 I provide a depending projection 56 each arranged in the path of movement of a cross pin 57 carried by each leg. The object of the projections is to provide maximum lift to the beams when said pins carried by the legs are in contact with said projections and cause a sudden dropping off of the beams from the pins when the legs have moved rearwardly during the forward travel of the tractor.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A land-leveling attachment for a tractor comprising in combination, a pair of parallel side beams adapted for pivotal attachment at their inner ends to a tractor, a scraper blade pivotally attached to the forward ends of said beams, supporting wheels rotatably mounted on the scraper blade exteriorly of the ends thereof, a pair of skid-shoes swingably attached to the forward ends of said beams and adapted to support the forward ends of said beams upon contact with the ground during rearward travel of the tractor, a pair of actuating levers pivotally attached at one of their ends to said beams, two pairs of toggle links pivotally attached at one of their ends to said beams and pivotally attached at their opposite ends to said scraper blade, means swingably attached to said beams and connected to said actuating levers for raising and lowering said toggle links for tilting said scraper blade rearwardly and forwardly with respect to said beams, a pair of lifting legs slidably attached near their lower ends to said beams and in rolling contact at their opposite ends with said toggle links and swingably attached to said actuating levers, whereby said lifting legs upon contact of their lower ends with the ground during forward travel of the tractor will elevate said beams and through the medium of said toggle links will swing said scraper blade into an elevated position with respect to the ground and whereby said supporting wheels will be lowered into rolling contact with the ground.

2. A land-leveling machine comprising in combination a tractor, a pair of parallel side beams pivotally attached at their inner ends to said tractor and extending forwardly therefrom, a scraper blade pivotally attached at its rear surface to the forward ends of said beams, supporting wheels rotatably mounted on the scraper blade exteriorly of the ends thereof, a pair of skid-shoes swingably attached to said beams rearwardly of said scraper blade and adapted to support the forward ends of said beams upon contact with the ground during rearward travel of the tractor, a pair of actuating levers pivotally connected at their bottom ends to said beams, two pairs of toggle links, one end of both pairs of said toggle links being pivotally attached to said beams and their opposite ends being pivotally attached to the upper portion of said scraper blade, a pair of frames pivotally attached at their bottom ends to said beams, a pair of rollers carried by the upper end of each of said frames and adapted for selective rolling contact with said toggle links, a pair of links connected at their forward ends to said frames and at their opposite ends to said actuating levers whereby forward and rearward movement of said frames will lower and raise said toggle links to tilt said scraper blade forwardly or rearwardly into various positions with respect to the ground in accordance with the movement of said actuating levers, a pair of lifting legs slidably attached near their lower ends to said beams and pivotally and swingably attached at their upper ends to said links, and each of said rollers being in rolling contact with said toggle links for tilting said legs forwardly into a ground-engaging position or rearwardly in an elevated position with respect to the ground.

3. Land-leveling apparatus adapted for attachment to a tractor, comprising in combination a pair of parallel side beams adapted to be pivotally attached at their inner ends to the tractor and extending forwardly therefrom, a scraper blade swingably attached at its rear surface to the forward ends of said beams and being of arcuate shape in cross-section and closed at both of its ends by end walls, supporting wheels rotatably mounted on the scraper blades exteriorly of said end plates, a pair of toggle links superimposed upon said beams and pivotally attached at one of their ends to said beams and at their opposite ends to the upper edge of said scraper blade, actuating levers pivotally attached to said beams and connected by links to a frame swingably attached to said beams, means carried by the upper ends of said frame for contact with said toggle links upon actuation of said actuating levers for raising and lowering said toggle links to impart respective rearward and forward tilting of said scraper blade about its pivotal connections to said beams, a pair of lifting legs slidably embracing said beams and extending therebelow, the upper ends of said legs being swingably and slidably connected to said links, and means carried by the upper ends of said legs for contact with said toggle links for lowering said legs into ground-engaging positions upon movement of said links in one direction and for elevating said legs with respect to the ground upon movement of said toggle links in one opposite direction.

HENRY W. KLAGES.

No references cited.